US010652035B1

(12) United States Patent
Bhagwat

(10) Patent No.: US 10,652,035 B1
(45) Date of Patent: May 12, 2020

(54) SIMULTANEOUS POWER INJECTION IN POWER OVER ETHERNET SYSTEM

(71) Applicant: Linear Technology Holding LLC, Wilmington, DE (US)

(72) Inventor: Gitesh Bhagwat, Santa Barbara, CA (US)

(73) Assignee: Linear Technology Holding LLC, Wilmington, DE (US)

( * ) Notice: Subject to any disclaimer, the term of this patent is extended or adjusted under 35 U.S.C. 154(b) by 0 days.

(21) Appl. No.: 16/433,832

(22) Filed: Jun. 6, 2019

Related U.S. Application Data

(60) Provisional application No. 62/754,282, filed on Nov. 1, 2018.

(51) Int. Cl.
| | | |
|---|---|---|
| *H04B 3/00* | (2006.01) | |
| *H04L 25/00* | (2006.01) | |
| *H04L 12/10* | (2006.01) | |
| *H01F 27/28* | (2006.01) | |
| *H02J 1/00* | (2006.01) | |

(52) U.S. Cl.
CPC ............. *H04L 12/10* (2013.01); *H01F 27/28* (2013.01); *H02J 1/00* (2013.01)

(58) Field of Classification Search
CPC ..... H04L 12/10; H04L 25/0276; H01F 27/28; H02J 1/00

USPC ................................. 375/257, 258, 219, 220
See application file for complete search history.

(56) References Cited

U.S. PATENT DOCUMENTS 8,824,570 B2 * 9/2014 Pischl ................. H04L 25/0276
375/257
2016/0308683 A1* 10/2016 Pischl ..................... H04L 12/10

* cited by examiner

*Primary Examiner* — Phuong Phu
(74) *Attorney, Agent, or Firm* — Patent Law Group; Brian D. Ogonowsky

(57) ABSTRACT

In a PoE system, DC power is transmitted over two wire pairs. The primary winding of an isolation transformer is connected across the differential I/O terminals of a first PHY (a transceiver). A positive voltage output of a power supply is connected to a center tap of the secondary winding, and the secondary winding is coupled across a first wire pair. In this way, differential data and DC power is supplied to the first wire pair. A CMC is connected between the secondary winding and an autotransformer which is also connected across the first wire pair. A center tap of the autotransformer is also connected to the positive voltage output of the power supply, so that the current to the powered device is shared by the isolation transformer and the autotransformer. A similar circuit, with a second PHY, is used for the DC power return path.

22 Claims, 9 Drawing Sheets

SIMULTANEOUS POWER INJECTION IN POWER OVER ETHERNET SYSTEM

CROSS-REFERENCE TO RELATED APPLICATIONS

This application claims priority to U.S. provisional application Ser. No. 62/754,282 filed Nov. 1, 2018, by Gitesh Bhagwat, incorporated herein by reference.

FIELD OF THE INVENTION

This invention relates to systems, such as Power Over Ethernet (PoE), where DC power is transmitted over differential data lines and, in particular, to a technique that enables a higher current to be transmitted without requiring components to have an increased current capacity.

BACKGROUND

It is known to transmit power over differential data lines to power remote equipment. Power Over Ethernet (PoE) is an example of one such system. In PoE, limited power is transmitted to Ethernet-connected equipment (e.g., VoIP telephones, security cameras, etc.) from an Ethernet switch. The Ethernet switch is the Power Sourcing Equipment (PSE). DC power from the switch is transmitted over two sets of twisted wire pairs in the standard CAT-5 cabling. One wire pair conducts the positive voltage while the other wire pair conducts the reference voltage (e.g., system ground). One or both of the wire pairs may also transmit and receive differential data signals, and the DC voltage is applied as common mode. In this way, the need for providing any external power source for the Powered Devices (PDs) can be eliminated. The standards for PoE are set out in IEEE 802.3, incorporated herein by reference. The CAT-5 cable has four twisted wire pairs, and two of the wire pairs are typically not used.

In such prior art systems, the power supply has one output (e.g., the positive voltage terminal) connected to only one node of a first DC coupling circuit that provides the positive voltage to a first wire pair, and has its other output (e.g., ground) connected to only one node of a second DC coupling circuit that provides the reference voltage on a second wire pair. One or both of the wire pairs also conducts differential data.

Since the power is coupled to only one node for each wire pair, all current flows through that one node. Therefore, all components connected in series between that node and the wire pair must carry the full PD current, so those components must be designed to safely conduct the maximum PD current.

In some cases, the power is transmitted through a magnetic component such as a center-tapped isolation transformer, an autotransformer, inductors, and/or a common mode choke (CMC). The current-carrying capacity of such a PoE system is often limited by the current-carrying capacity of the magnetic components. Due to constraints in magnetic design, it may not be feasible to increase the current-carrying capacity of these devices beyond a certain limit. Below are some of the design constraints on the magnetic components.

A center tapped transformer presents a load to the differential data. This loading effect is typically characterized as the transmitter droop specification or the return loss and needs to be better than the worst-case limit specified in the corresponding standards for reliable communication. This dictates some design constraints on the center tap transformer which include a minimum Open Circuit Inductance (OCL) and Self Resonant Frequency (SRF). Also, since the transformer needs to magnetically couple the differential data signal from its primary winding to its secondary winding, it needs to have low leakage inductance which can otherwise adversely affect the return loss. The transformer also provides galvanic isolation and needs to be able to survive a high voltage across the isolation barrier. Considering these requirements, the transformer needs to have a minimum number of winding turns, a low enough parasitic capacitance, a tight enough magnetic coupling, and a high breakdown potential for the winding insulation. With these and other constraints (e.g., on the core material), increasing the current capacity of the transformer may not be technically and economically feasible beyond a certain value. Similar design constraints are applicable to the other magnetic components as well.

A CMC ideally presents no load to the differential data. This requires that it is a tightly coupled (high magnetic-coupling coefficient) device with low leakage and a low inter-winding capacitance. The CMC, however, needs to present a high impedance to the common mode (CM) signals. This dictates a minimum Open Circuit Inductance (OCL) and a minimum Self Resonant Frequency. It is noteworthy that different parasitic capacitances get excited (and become relevant) when measuring the Differential Mode Return Loss or the Common Mode Insertion Loss. These restrictions on the CMC design also mean that increasing the current capacity of the CMC may not be technically and economically feasible beyond a certain value.

What is needed is a new PoE technique that can supply more power to the powered device without requiring the magnetic components to be designed with an increased current capacity.

SUMMARY

In one embodiment of a PoE system, for a DC power injection path, the primary winding of a first center-tap isolation transformer is connected across the differential input/output (I/O) terminals of a first PHY (a transceiver). A positive voltage output of a power supply is connected to a center tap of the secondary winding. In this way, differential data and DC power is supplied through the windings of the first isolation transformer.

A first CMC is connected in series between the secondary winding and a first wire pair. The first CMC provides a high impedance to common mode noise and a low impedance to differential signals.

A first autotransformer is connected across the terminals of the CMC and the first wire pair. A center tap of the first autotransformer is connected to the positive voltage output of the power supply, so that all current from the power supply to the PD is shared (possibly equally) by the first isolation transformer and the autotransformer. The CMC only conducts the current applied to the isolation transformer.

Accordingly, a larger current can be supplied to the PD without increasing the current carrying capacity of the first isolation transformer, first CMC, and first autotransformer. Also, these separate devices can be optimized individually to achieve the desired performance.

The autotransformer may be substituted with a pair of matched inductors, another CMC, or a differential mode choke (DMC).

The PoE circuit for the DC power return path is identical to the DC power injection path and couples the power supply's reference voltage to a second wire pair. The PoE circuit for the DC return path comprises a second PHY, a second isolation transformer, a second CMC, and a second autotransformer (or matched inductors, or another CMC, or DMC). The DC power return path may also be through the shield of a coaxial cable.

The current to the PD is provided by the two sets of wire pairs, and differential data may be independently conducted by either or both wire pairs to one or more PDs.

Various other embodiments are described.

The terms PSE and PD are used throughout this disclosure to identify equipment that supplies power and equipment that receives the power, and such equipment/devices are not limited to Ethernet equipment/devices unless specified.

BRIEF DESCRIPTION OF THE DRAWINGS

Elements that are the same or equivalent are labeled with the same numeral.

DETAILED DESCRIPTION

Figure 1:
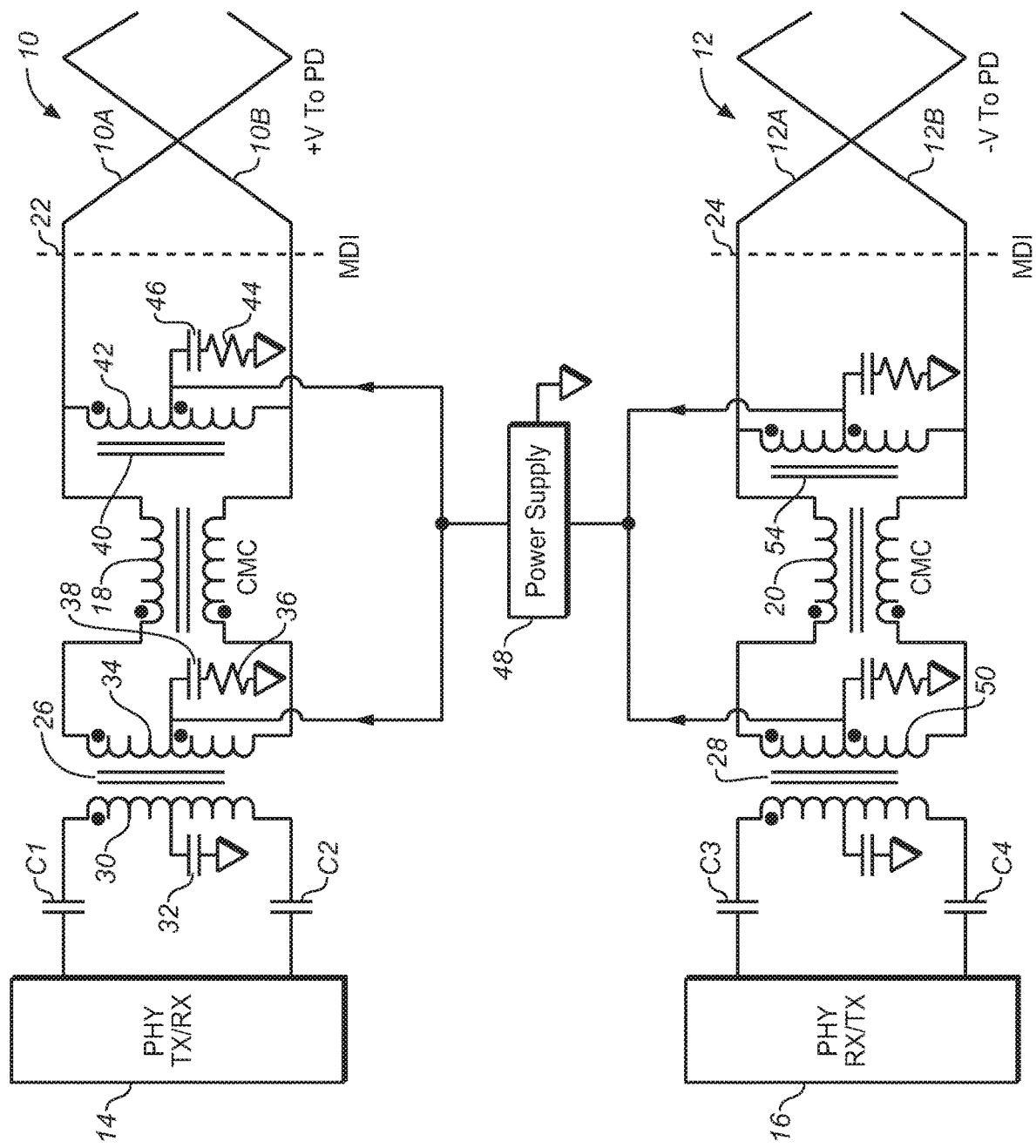
FIG. 1 illustrates a PoE-enabled Ethernet system, in accordance with one embodiment of the invention, using two wire pairs for supplying DC power to the PD, where the power is shared by an isolation transformer and an autotransformer to reduce the current requirements of each.

FIG. 1 illustrates an embodiment of a PoE system where DC power is provided to a powered device (PD) via wire pairs 10 and 12, and Ethernet differential signals are transmitted and received by the PHYs 14 and 16 (transceivers) via the wire pairs 10/12. In a typical embodiment, the wire pairs 10/12 would be twisted pairs. Common mode noise is greatly attenuated by the CMCs 18 and 20. Conventional RC termination circuits (not shown) may be connected to the wires 10A, 10B, 12A, and 12B, and are designed to prevent common mode reflections.

The PHYs 14/16 represent the physical layer in the OSI model (Open Systems Interconnection model) and are transceivers that typically include signal conditioning and decoding circuitry for presenting bits to the next stage. The term PHY is a term of art and is defined by various IEEE standards, depending on the particular application. The PHYs 14/16 are typically integrated circuits. A digital processor (not shown) is coupled to the PHYs 14/16 for processing the data.

The CMCs 18/20 are in-line transformers with two windings, where each winding is in series with a wire in the associated twisted wire pair. As shown by the dots on the CMC 18/20 windings, the windings have the same polarity, so the magnetic fields generated by a differential mode signal are substantially cancelled out. Thus, the CMCs 18/20 present little inductance or impedance to differential-mode currents. Common mode currents, such as ambient noise in the wire pair, however, see a high impedance due to the combined inductances of the windings.

The CMCs 18/20 ideally eliminate or greatly attenuate common mode RF noise while providing no loss for the differential or DC voltage signals.

Each PHY 14/16 outputs differential data and receives differential data via a respective Media Dependent Interface (MDI) connector 22 and 24 coupled to wires of a twisted wire pair.

One or more conventional PDs, with PHYs that may be similar to the PHYs 14/16, is/are coupled to the other ends of the wire pairs 10/12. Only one PD will be assumed.

The PHYs 14/16 are connected to the MDI connector 22/24 via the CMCs 18/20, AC coupling capacitors C1, C2, C3, and C4, and galvanic isolation transformers 26 and 28. The polarities of the windings are designated by the dots.

The PHY 14 has I/O terminals coupled across a primary winding 30 of the transformer 26. The primary winding 30 has an optional center tap coupled to ground via a capacitor 32. One end of the secondary winding 34 is directly coupled to one winding of the CMC 18, and the other end is directly coupled to the other winding of the CMC 18.

A center tap of the secondary winding 34 is optionally coupled to ground via a resistor 36 and capacitor 38.

An autotransformer 40 is coupled across the wires 10A and 10B. A center tap of the autotransformer winding 42 is optionally coupled to ground via a resistor 44 and capacitor 46. The center tapped winding of the autotransformer 40 may be considered to be two magnetically-coupled inductors connected in series.

A positive voltage output of a DC power supply 48 is coupled to the secondary winding center tap of the isolation transformer 26 and to the center tap of the autotransformer 40. The injected DC current flows through the windings and the wires 10A and 10B. The injected PD current is substantially shared equally (if the two impedances are assumed equal) and simultaneously by the windings 34 and 42, assuming the CMC 18 windings present negligible DC resistance. Since the PD current is shared, the isolation transformer 26 and the autotransformer 40 just need to handle one-half the maximum PD current. The CMC 18 also conducts just one-half of the PD current. This eases the design of the magnetic components.

On the return side of the PoE system, the reference or ground terminal of the power supply 48 is coupled to the center taps of the secondary winding 50 of the isolation transformer 28 and the autotransformer 54. The same current sharing occurs for the return path to ease the design of the magnetic components. The components in the injection path and return path may be matched.

The autotransformers 40/54 present a high impedance to data signals, the CMCs 18/20 attenuate common mode noise, and the isolation transformers 26/28 block DC and common mode noise and couple the differential signals to/from the PHYs 14/16. The AC-coupling capacitors C1-C4 also block DC and are optional.

The CMCs 18/20 may be deleted if there is low common mode noise, since the isolation transformers 26/28 attenuates common mode noise.

The DC flux in the center-tapped windings cancels out as long as the currents through the two sections of the center-tap windings are the same.

The outputs of the power supply 48 are arbitrarily designated positive (+V) and negative (−V), but the voltages can be any levels.

If precise current sharing is desired between the autotransformer 40/54 and the isolation transformer 26/28, a multi-phase power supply can be used as the power supply 48 and controlled so as to offset the DC voltage drop across the CMCs 18/20 and other impedance mismatches resulting in equal current sharing. The multi-phase power supply has additional outputs so that the power to the isolation transformer 26/28 and the autotransformer 40/54 is separately controllable. The ratio of current sharing between the autotransformer 40/54 and the isolation transformer 26/28 can also be adjusted according to the current capacity of the devices in the two paths. This can further help optimize the device designs.

The open circuit inductance (OCL) of the autotransformer 40/54 is in parallel with the OCL of the isolation transformer 26/28. To preserve the Low Frequency Return Loss (and transmitter droop requirement), the effective OCL of the combination of the devices will need to be considered. Hence, the OCL of individual devices may need to be increased. This OCL increase can be offloaded to the autotransformer 40/54 by making its OCL larger. Individual OCLs can be optimized.

A similar scheme can be used for sharing current by four pairs of wires.

Figure 2:
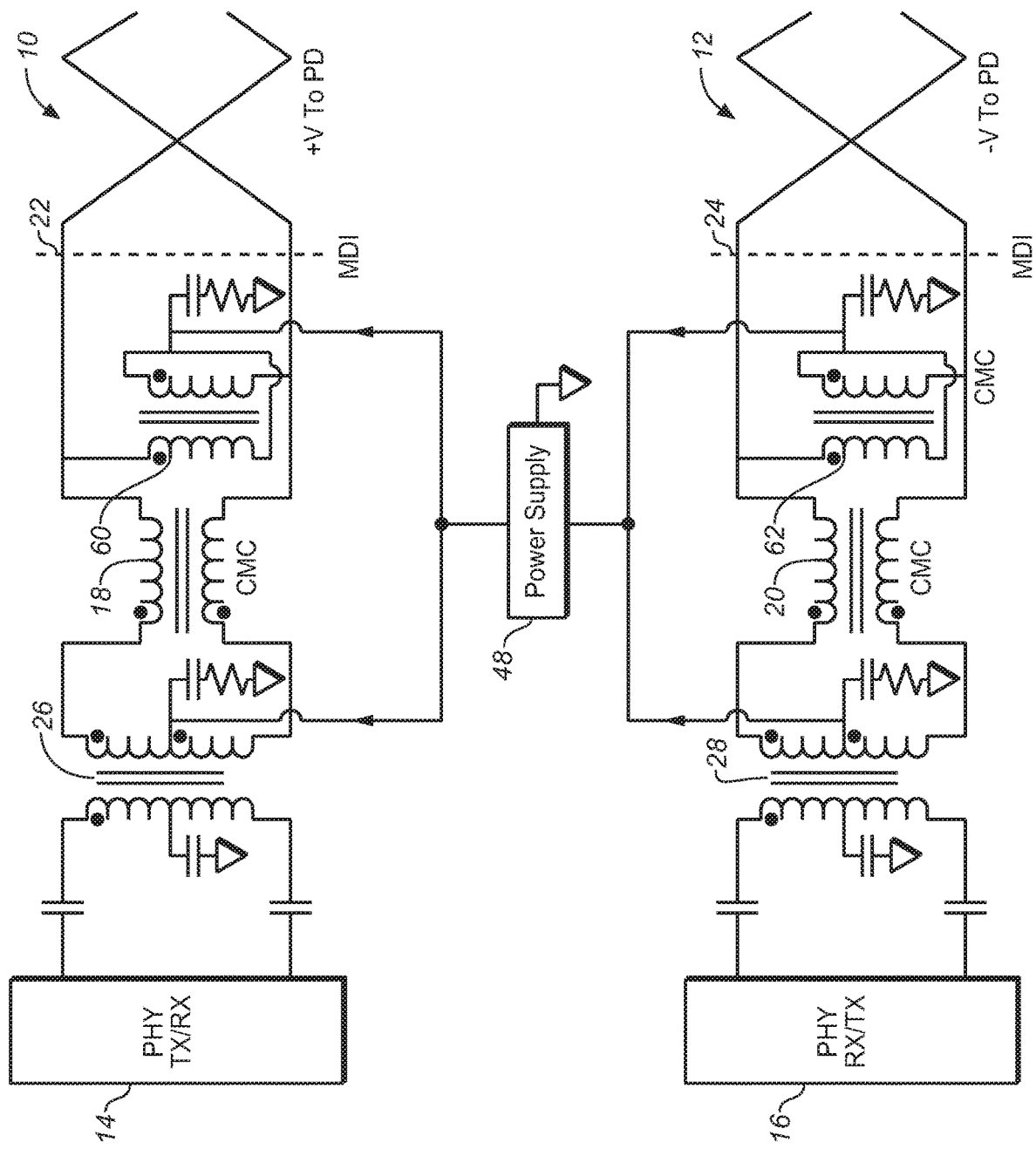
FIG. 2 illustrates a PoE-enabled Ethernet system, in accordance with another embodiment of the invention, where the DC power is shared by an isolation transformer and a CMC.

FIG. 2 is identical to FIG. 1 except that the autotransformers have been replaced with CMCs 60/62. The windings of the CMCs 60/62 are connected in series, and the middle node is coupled to the power supply 48. The windings of each CMC 60/62 may be considered to be two magnetically-coupled inductors connected in series. The operation is similar to that of FIG. 1.

Figure 3:
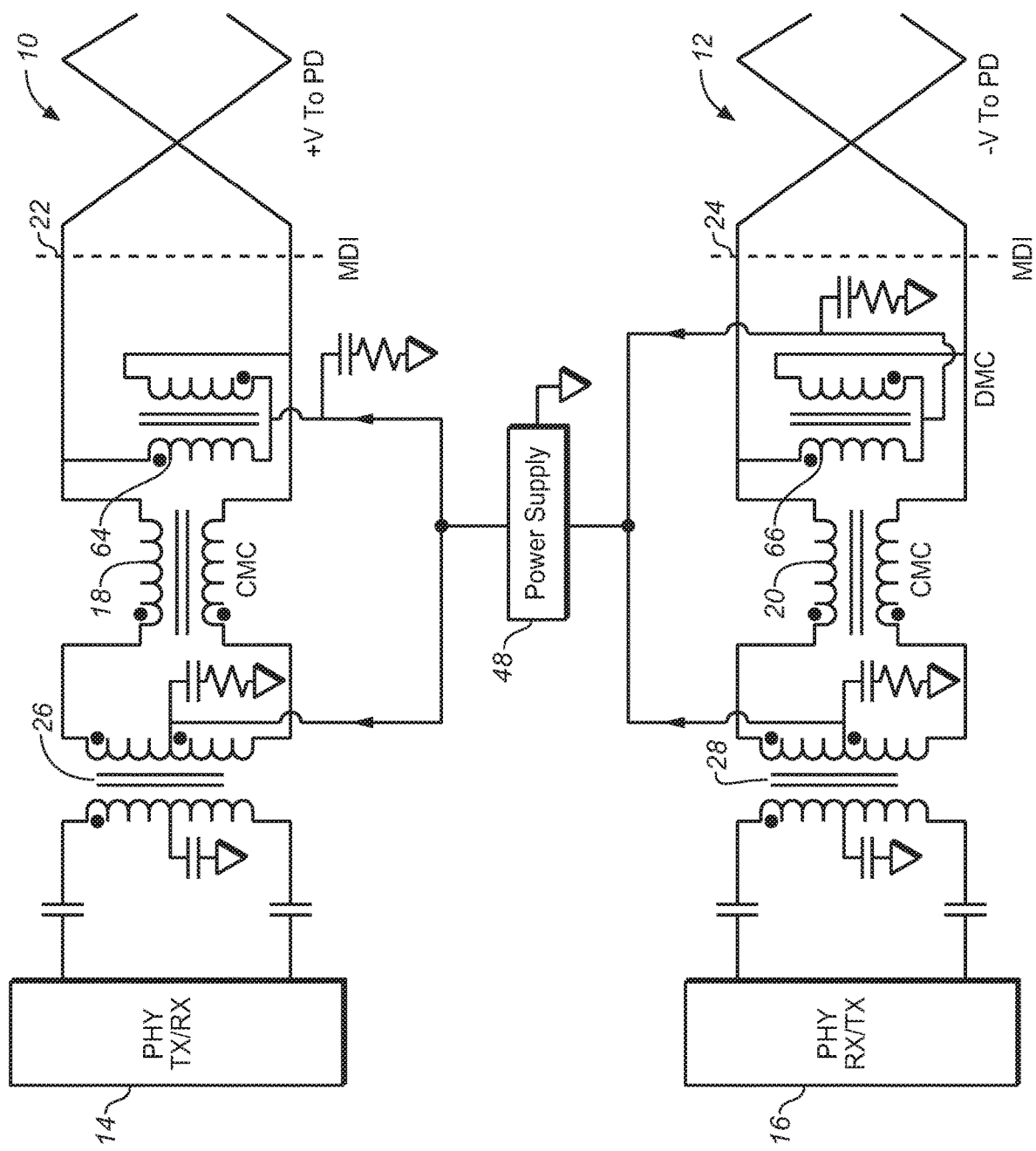
FIG. 3 illustrates a PoE-enabled Ethernet system, in accordance with another embodiment of the invention, where the DC power is shared by an isolation transformer and a DMC.

FIG. 3 is identical to FIG. 1 except that the autotransformers have been replaced with differential mode chokes (DMCs) 64/66. The windings of the DMCs 64/66 are connected in series, and the middle node is coupled to the power supply 48. The windings of each DMC 64/66 may be considered to be two magnetically-coupled inductors connected in series. The operation is similar to that of FIG. 1.

Figure 4:
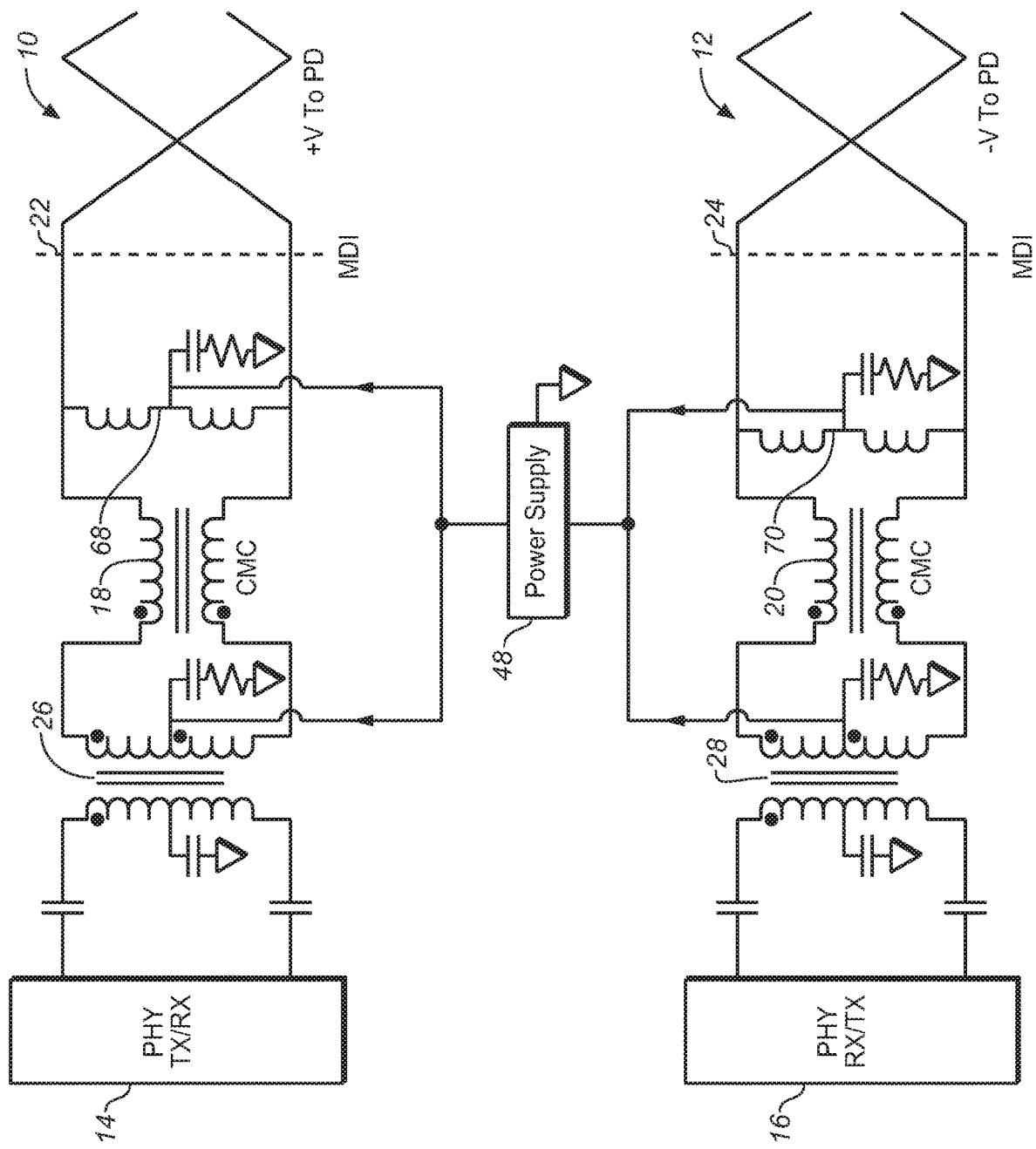
FIG. 4 illustrates a PoE-enabled Ethernet system, in accordance with another embodiment of the invention, where the DC power is shared by an isolation transformer and matched inductors.

FIG. 4 is identical to FIG. 1 except that the autotransformers have been replaced with matched inductors 68/70. The middle node is coupled to the power supply 48. The operation is similar to that of FIG. 1.

Figure 5:
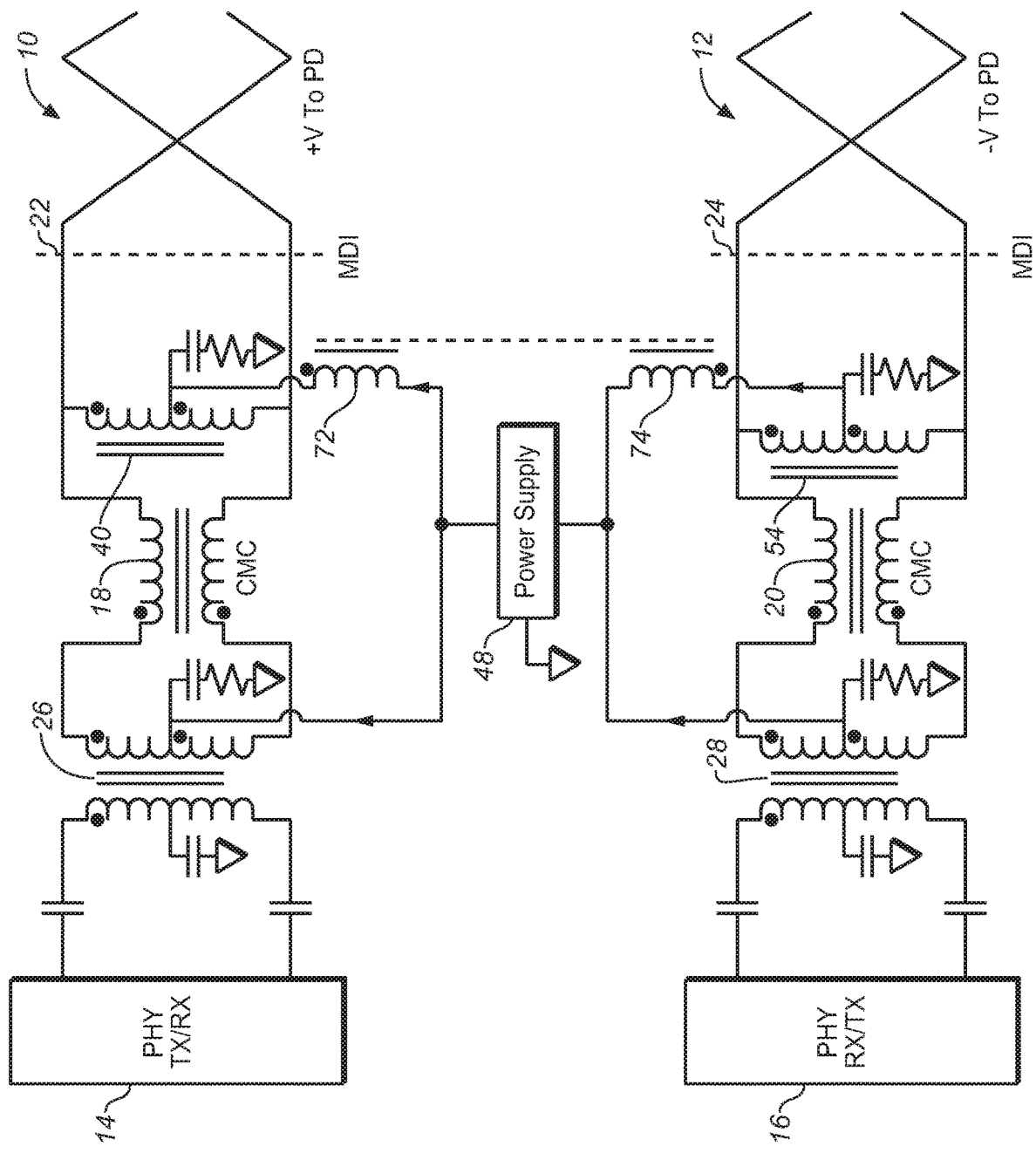
FIG. 5 illustrates a PoE-enabled Ethernet system, in accordance with another embodiment of the invention, where the DC power is shared by an isolation transformer and an autotransformer. Current through the autotransformer is via a magnetically coupled inductor.

FIG. 5 is identical to FIG. 1 except that the power supply 48 output is coupled to the autotransformer center taps via magnetically coupled windings 72 and 74. This helps in preserving the impedance of common mode terminations on the center tap. As the flux generated by forward and return currents is in opposite direction, the DC flux generated by windings 72 and 74 can cancel out. The operation is similar to that of FIG. 1.

Figure 6:
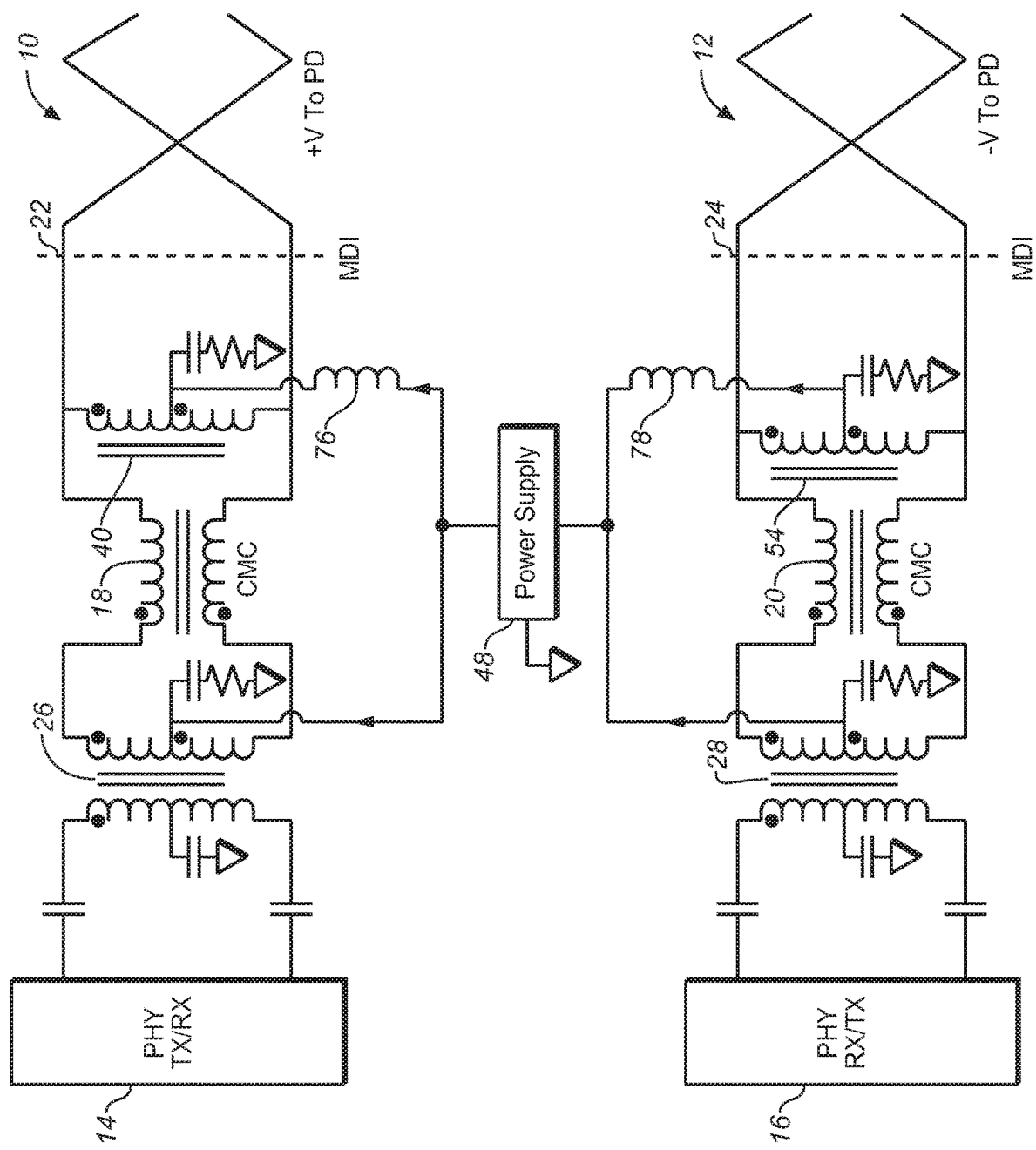
FIG. 6 illustrates a PoE-enabled Ethernet system, in accordance with another embodiment of the invention, where the DC power is shared by an isolation transformer and an autotransformer. Current through the autotransformer is via an inductor.

FIG. 6 is identical to FIG. 1 except that the power supply 48 output is coupled to the autotransformer center taps via un-coupled inductors 76 and 78. The operation is similar to that of FIG. 1.

Figure 7:
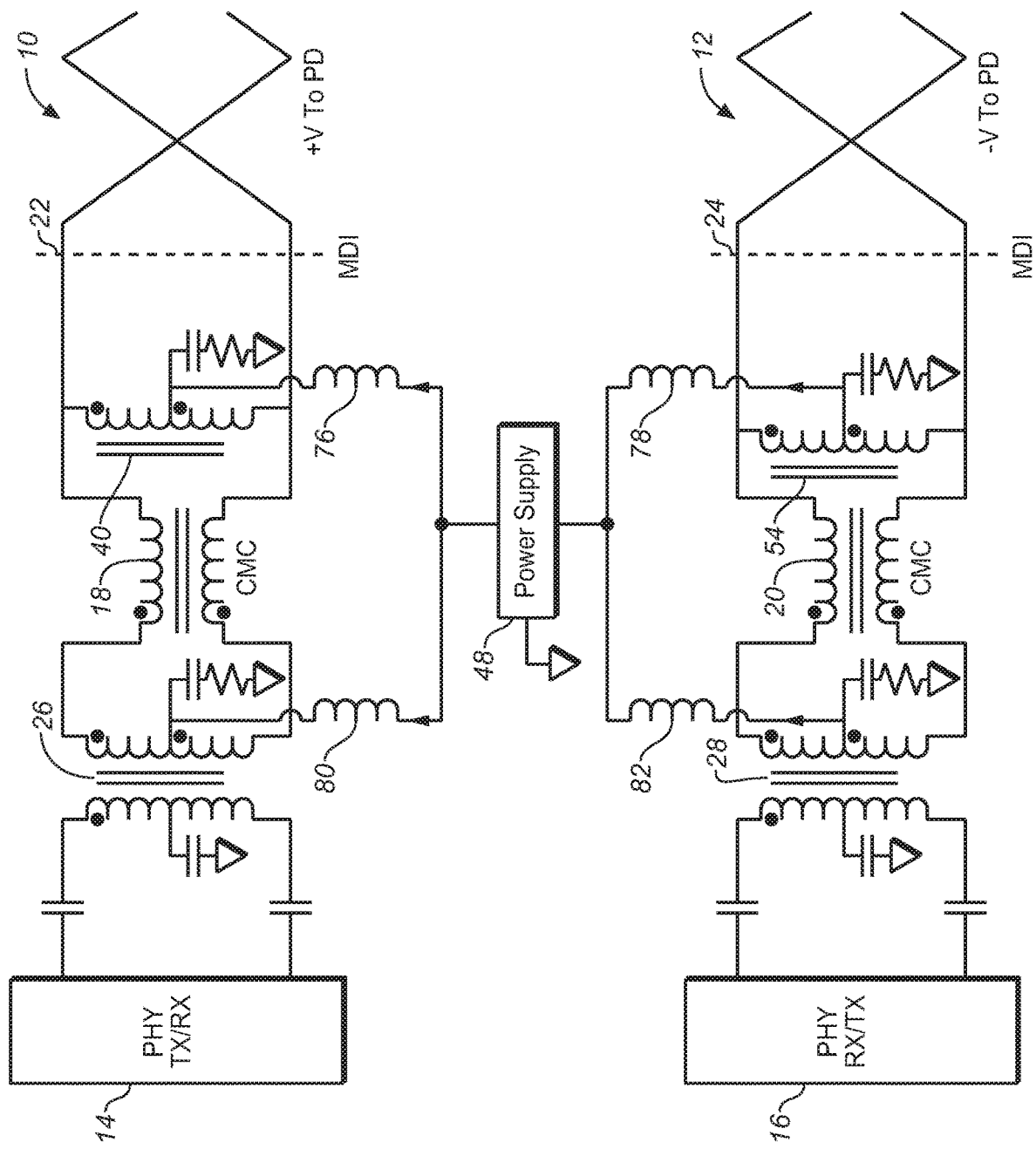
FIG. 7 illustrates a PoE-enabled Ethernet system, in accordance with another embodiment of the invention, where the DC power is shared by an isolation transformer and an autotransformer. Currents through the isolation transformer and autotransformer are via inductors.

FIG. 7 is identical to FIG. 6 except that the power supply 48 output is also coupled to the isolation transformer 26/28 center taps via un-coupled inductors 80 and 82. The operation is similar to that of FIG. 1.

Figure 8:
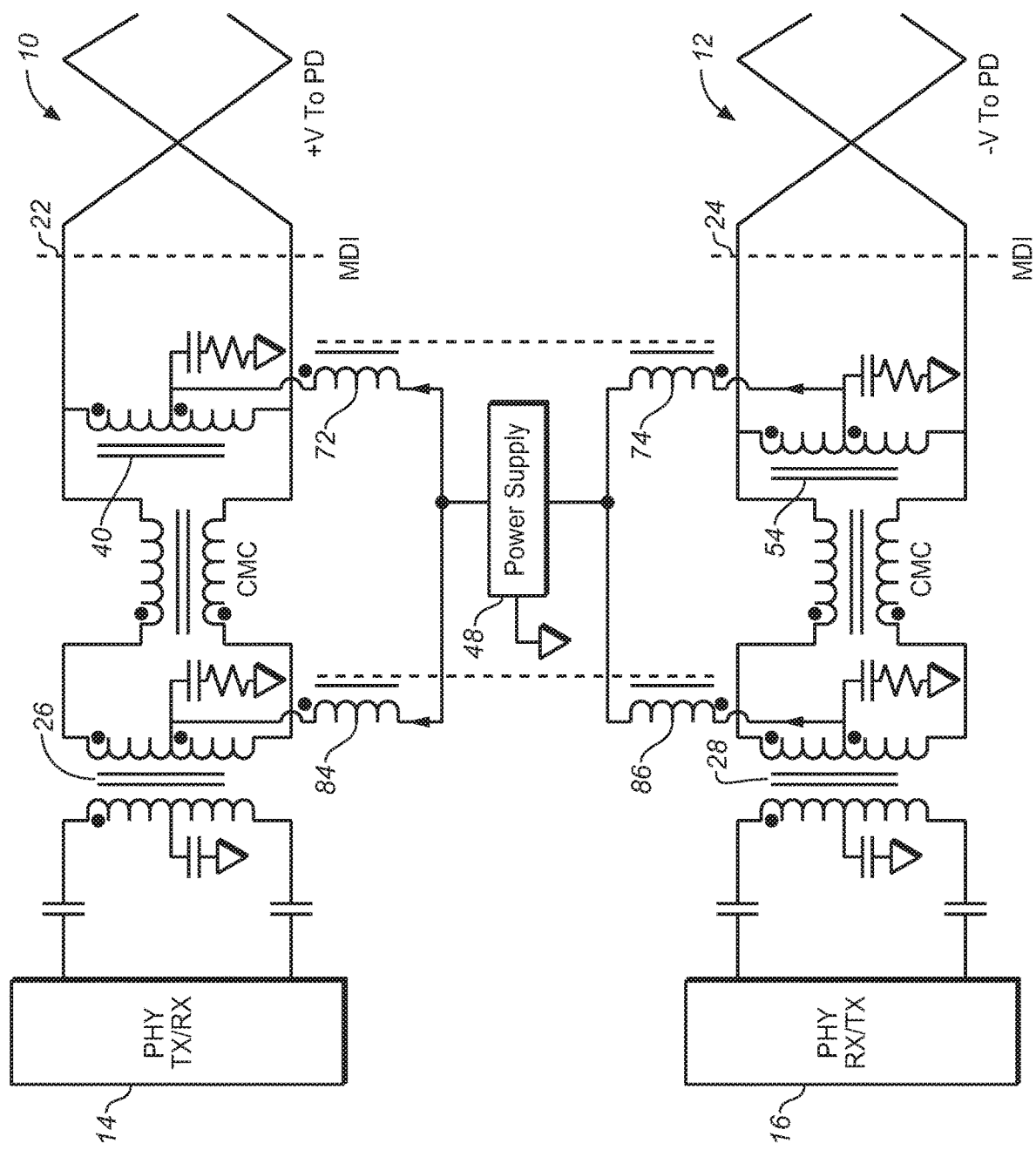
FIG. 8 illustrates a PoE-enabled Ethernet system, in accordance with another embodiment of the invention, where the DC power is shared by an isolation transformer and an autotransformer. Currents through the isolation transformer and autotransformer are via magnetically coupled inductors.

FIG. 8 is identical to FIG. 5 except that the power supply 48 output is also coupled to the isolation transformer 26/28 center taps via magnetically coupled windings 84 and 86. The operation is similar to that of FIG. 1.

Figure 9:
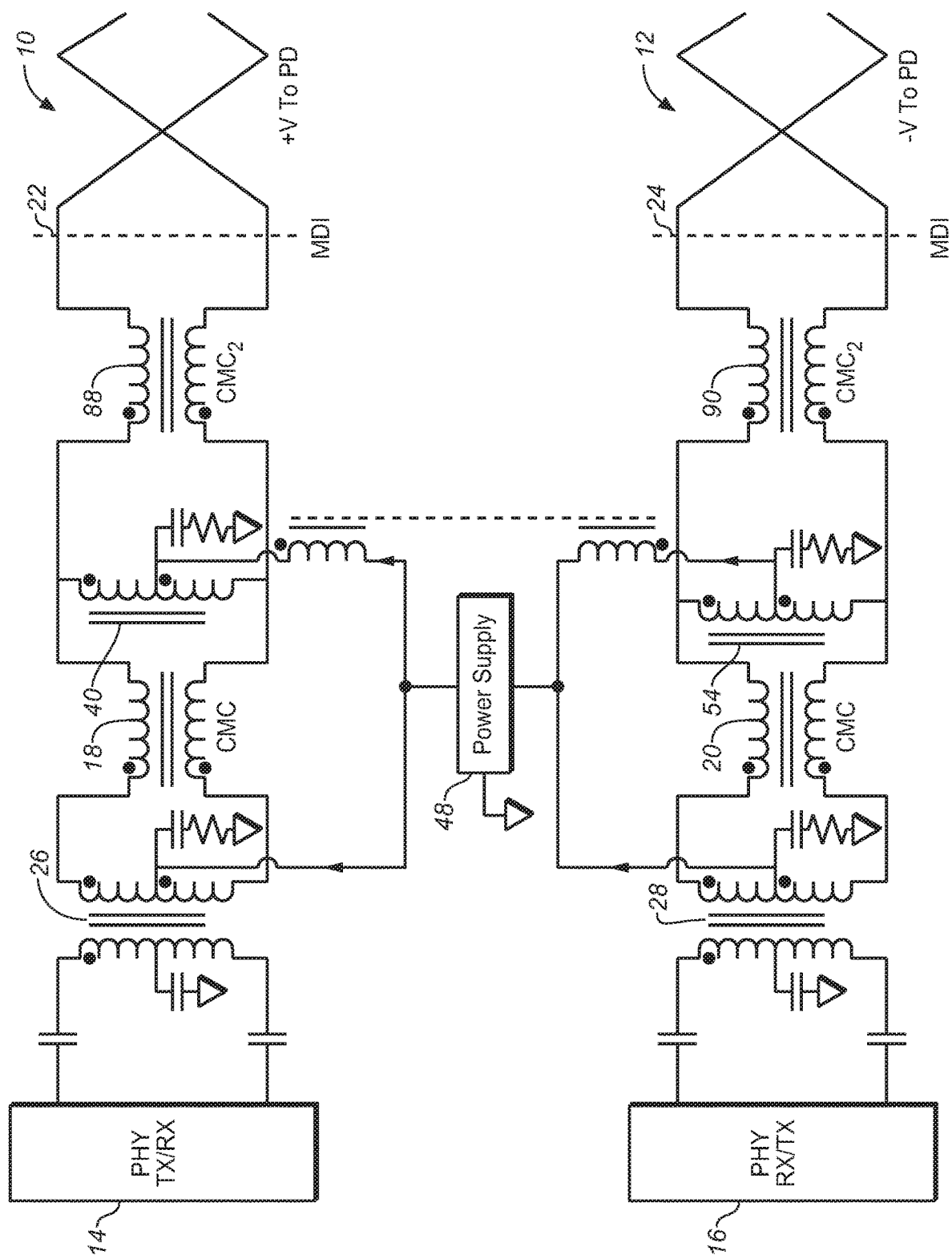
FIG. 9 is similar to FIG. 5 except another CMC is added at the wire pair connection to provide a high impedance to common mode signals to preserve the common mode terminations.

FIG. 9 is identical to FIG. 5 except that another CMC 88/90 is added for additional attenuation of common mode noise and/or for augmenting the inductance of CMC 18/20. If an RC termination circuit (designed to match the common mode impedance of the wires) is used for terminating each wire to prevent reflections of common mode noise, the high impedance of the CMC 88/90 to common mode noise preserves the common mode terminations.

Although only the power injecting side of the PoE system is shown in the figures, the differential data path of the PD side may be identical to that shown in the power injecting side. Any type of DC de-coupling circuit can be used in the PD for de-coupling DC power from the conductors to power a PD load. The PD may be conventional.

Any combinations of the features of the various figures may be combined to realize the various advantages described herein.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:

1. A Power over Ethernet (PoE) circuit for connection to a first pair of wires and a second pair of wires, the first pair of wires comprising a first conductor and a second conductor, the second pair of wires comprising a third conductor and a fourth conductor, the PoE circuit comprising:
   a first portion comprising:
      a first transceiver having a first terminal and a second terminal, the first transceiver for transmitting data signals over the first wire pair;
      a first isolation transformer having a primary winding and a secondary winding, the first terminal and the second terminal of the first transceiver being coupled across the primary winding of the first isolation transformer;
      the secondary winding of the first isolation transformer having a first end coupled to the first conductor, and having a second end coupled to the second conductor, the secondary winding having a first center tap; and
      a first inductor and a second inductor connected in series across the first conductor and the second conductor, the first inductor and the second inductor being connected together at a first node;

a second portion comprising:
  a second transceiver having a first terminal and a second terminal, the second transceiver for transmitting data signals over the second wire pair;
  a second isolation transformer having a primary winding and a secondary winding, the first terminal and the second terminal of the second transceiver being coupled across the primary winding of the second isolation transformer;
  the secondary winding of the second isolation transformer having a first end coupled to the third conductor, and having a second end coupled to the fourth conductor, the secondary winding having a second center tap; and
  a third inductor and a fourth inductor connected in series across the third conductor and the fourth conductor, the third inductor and the fourth inductor being connected together at a second node; and a DC power supply configured to inject power into both the first center tap and the first node, and accept return power from both the second center tap and the second node, such that DC power is supplied to the first wire pair via the first isolation transformer, the first inductor, and the second inductor, and power is returned via the second isolation transformer, the third inductor, and the fourth inductor.

2. The PoE circuit of claim 1 wherein the DC power supply is configured to simultaneously inject the power into both the first center tap and the first node, and simultaneously accept the return power from both the second center tap and the second node, such that DC power is simultaneously supplied to the first wire pair via the first isolation transformer, the first inductor, and the second inductor, and power is simultaneously returned via the second isolation transformer, the third inductor, and the fourth inductor.

3. The PoE circuit of claim 1
  wherein the first inductor and the second inductor connected in series across the first conductor and the second conductor comprise a first autotransformer with a third center tap coupled to the power supply, and
  wherein the third inductor and the fourth inductor connected in series across the third conductor and the fourth conductor comprise a second autotransformer with a fourth center tap coupled to the power supply.

4. The PoE circuit of claim 3 wherein the DC power supply comprises a multi-phase power supply so that injected power into the first isolation transformer and the first autotransformer is separately controllable, and the return power from the second isolation transformer and the second autotransformer is separately controllable.

5. The PoE circuit of claim 1
  wherein the first inductor and the second inductor connected in series across the first conductor and the second conductor comprise a first common mode choke coupled to the power supply, and
  wherein the third inductor and the fourth inductor connected in series across the third conductor and the fourth conductor comprise a second common mode choke coupled to the power supply.

6. The PoE circuit of claim 1
  wherein the first inductor and the second inductor connected in series across the first conductor and the second conductor comprise a first differential mode choke coupled to the power supply, and
  wherein the third inductor and the fourth inductor connected in series across the third conductor and the fourth conductor comprise a second differential mode choke coupled to the power supply.

7. The PoE circuit of claim 1 wherein the first center tap is coupled to ground via a first capacitor, and the second center tap is coupled to ground via a second capacitor.

8. The PoE circuit of claim 1 wherein the first node between the first inductor and the second inductor is coupled to ground via a first capacitor, and the second node between the third inductor and the fourth inductor is coupled to ground via a second capacitor.

9. The PoE circuit of claim 1 further comprising:
  a first common mode choke coupled between the first isolation transformer, the first inductor, and the second inductor; and
  a second common mode choke coupled between the second isolation transformer, the third inductor, and the fourth inductor.

10. The PoE circuit of claim 1 further comprising:
  a fifth inductor coupled between the power supply and the first node between the first inductor and the second inductor; and
  a sixth inductor coupled between the power supply and the second node between the third inductor and the fourth inductor.

11. The PoE circuit of claim 10 wherein the fifth inductor and the sixth inductor are magnetically coupled.

12. The PoE circuit of claim 11 further comprising:
  a seventh inductor coupled between the power supply and the first center tap of the secondary winding of the first isolation transformer; and
  an eighth inductor coupled between the power supply and the second center tap of the secondary winding of the second isolation transformer.

13. The PoE circuit of claim 12 wherein the seventh inductor and the eighth inductor are magnetically coupled.

14. The PoE circuit of claim 1 further comprising:
  a first AC-coupling capacitor coupled between the first terminal of the first transceiver and a first end of the primary winding of the first isolation transformer;
  a second AC-coupling capacitor coupled between the second terminal of the first transceiver and a second end of the primary winding of the first isolation transformer;
  a third AC-coupling capacitor coupled between the first terminal of the second transceiver and a first end of the primary winding of the second isolation transformer; and
  a fourth AC-coupling capacitor coupled between the second terminal of the second transceiver and a second end of the primary winding of the second isolation transformer.

15. The PoE circuit of claim 1 wherein the first transceiver comprises a first PHY in a physical layer in the Open Systems Interconnection (OSI) model, and the second transceiver comprises a second PHY in the physical layer in the OSI model.

16. The PoE circuit of claim 1 further comprising:
  the first pair of wires coupled across the first inductor and the second inductor; and
  the second pair of wires coupled across the third inductor and the fourth inductor.

17. The PoE circuit of claim 16 further comprising:
  a first common mode choke coupled between the first pair of wires and the first inductor and the second inductor; and a second common mode choke coupled between the second pair of wires and the third inductor and the fourth inductor.

18. A method performed by a Power over Ethernet (PoE) circuit connected to a first pair of wires and a second pair of wires, the first pair of wires comprising a first conductor and a second conductor, the second pair of wires comprising a third conductor and a fourth conductor, the method comprising:

operating a first portion comprising the steps of:
transmitting first data signals, by a first transceiver having a first terminal and a second terminal, over the first wire pair;
applying the first data signals across a primary winding of a first isolation transformer, the first isolation transformer also having a secondary winding, the secondary winding of the first isolation transformer having a first end coupled to the first conductor, and having a second end coupled to the second conductor, the secondary winding of the first isolation transformer having a first center tap;
applying a voltage, corresponding to the first data signals, across the secondary winding of the first isolation transformer to the first wire pair; and
applying a first DC voltage, from a DC power supply, to a first node of a first inductor and a second inductor connected in series across the first conductor and the second conductor;

operating a second portion comprising the steps of:
transmitting second data signals, by a second transceiver having a first terminal and a second terminal, over the second wire pair;
applying the second data signals across a primary winding of a second isolation transformer, the second isolation transformer also having a secondary winding, the secondary winding of the second isolation transformer having a first end coupled to the third conductor, and having a second end coupled to the fourth conductor, the secondary winding of the second isolation transformer having a second center tap;
applying a voltage, corresponding to the second data signals, across the secondary winding of the second isolation transformer to the second wire pair; and
applying a second DC voltage, from the DC power supply, to a second node of a third inductor and a fourth inductor connected in series across the third conductor and the fourth conductor, such that DC power is supplied to the first wire pair via the first isolation transformer, the first inductor, and the second inductor, and power is returned from the second wire pair via the second isolation transformer, the third inductor, and the fourth inductor.

19. The method of claim 18
wherein the first inductor and the second inductor connected in series across the first conductor and the second conductor comprise a first autotransformer with a third center tap coupled to the first DC voltage of the power supply, and
wherein the third inductor and the fourth inductor connected in series across the third conductor and the fourth conductor comprise a second autotransformer with a fourth center tap coupled to the second DC voltage of the power supply.

20. The method of claim 18
wherein the first inductor and the second inductor connected in series across the first conductor and the second conductor comprise a first common mode choke coupled to the first DC voltage of the power supply, and
wherein the third inductor and the fourth inductor connected in series across the third conductor and the fourth conductor comprise a second common mode choke coupled to the second DC voltage of the power supply.

21. The method of claim 18
wherein the first inductor and the second inductor connected in series across the first conductor and the second conductor comprise a first differential mode choke coupled to the first DC voltage of the power supply, and
wherein the third inductor and the fourth inductor connected in series across the third conductor and the fourth conductor comprise a second differential mode choke coupled to the second DC voltage of the power supply.

22. The method of claim 18 further comprising:
conducting the voltage across the secondary winding of the first isolation transformer through a first common mode choke coupled between the first isolation transformer, the first inductor, and the second inductor; and
conducting the voltage across the secondary winding of the second isolation transformer through a second common mode choke coupled between the second isolation transformer, the third inductor, and the fourth inductor.

* * * * *